United States Patent [19]

Cohen

[11] Patent Number: 4,672,188

[45] Date of Patent: Jun. 9, 1987

[54] FOCUS DETECTOR FOR OPTICAL APPARATUS

[75] Inventor: Donald K. Cohen, Tucson, Ariz.

[73] Assignee: International Business Machines Corporation, Armonk, N.Y.

[21] Appl. No.: 762,237

[22] Filed: Aug. 5, 1985

[51] Int. Cl.[4] .................................................. G11B 7/00
[52] U.S. Cl. ................................ 250/201; 250/237 R; 369/45
[58] Field of Search ............................ 250/201, 237 R; 369/44–46, 111, 112; 358/342

[56] References Cited

U.S. PATENT DOCUMENTS 4,441,175  4/1984  Shuman .................................. 369/45
4,517,666  5/1985  Ando ............................ 250/201 DF

FOREIGN PATENT DOCUMENTS 0070431  4/1983  Japan ..................................... 369/45

*Primary Examiner*—Edward P. Westin
*Attorney, Agent, or Firm*—H. F. Somermeyer

[57] ABSTRACT

An optical disk recorder focus-error system includes a so-called "knife-edge" focus detector. The dynamic range of the detector is enlarged by placing an apertured mask intermediate the knife edge and the source of the light beam being focused. The knife-edge mask and the apertured mask can be deposited opaque films on a lens.

4 Claims, 3 Drawing Figures

FOCUS DETECTOR FOR OPTICAL APPARATUS

BACKGROUND OF THE INVENTION

1. Field of the Invention

The present invention relates to optical apparatus, particularly focus detection and control systems for use with optical information-bearing-signal recorders.

2. Discussion of the Prior Art

Optical information-bearing-signal recorders, particularly of the optical or video disk type, retentively store information-bearing signals at extremely high areal densities. As such densities are increased, the preciseness required in controlling the recorder for faithful recording and reproduction of information-bearing signals greatly increases. One critical aspect of recording is to maintain the laser writing beam and the laser reading beam in focus at the appropriate level of the optical record medium. Various optical focusing systems have been provided, including those of the so-called "knife-edge" type. One advantage of knife-edge focus detectors is their simplicity. An example of such a detector is found in U.S. Pat. No. 4,079,248. While such known knife-edge focusing apparatus may be quite satisfactory for many present-day optical-disk areal densities, increased areal densities require yet greater focusing preciseness.

U.S. Pat. No. 4,517,666 (priority Japan, June 22, 1981, SN 56-96198) shows an optical focusing system having a light-shielding plate with an aperture, slit or knife edge arranged between the projection lens and the objective lens. Only part of the laser beam which passes through an area spaced apart from a common axis of the objective and projection lenses is transmitted through its aperture. While this arrangement provides a spatial disturbance of the light beam for focus detection, it does not show any mechanism for controlling the rate of change of focus-error signal at and near point of focus. This latter control is desired for facilitating focus servoing at the point of focus at low cost.

For present-day optical information-bearing-signal storage devices, a focus-control circuit must keep the laser beam in focus with respect to the recording surface. Techniques which generate a signal indicative of a focus error rely on the fact that, when the recording surface is in focus and the focusing lens is illuminated with a collimated beam such as a laser beam, the reflected beam also is collimated. When the beam is out of focus, the returned, or reflected, beam is either converging or diverging, respectively, for the medium being too far from or too close to the optical system. The knife-edge detector, on the other hand, introduces asymmetry which appears at the detector only in out-of-focus conditions.

It is desired to enhance the dynamic range of the focus-error-signal generation beyond that provided by a regular knife-edge focus-error detector. Such dynamic range again provides for a greater preciseness in focus control which is useful at higher areal densities than presently employed.

SUMMARY OF THE INVENTION

An object of the present invention is to provide means and methods for controlling the dynamic range of a focus-error detector, particularly a focus-error detector of the knife-edge type. According to the invention, in an optical data recorder focus-error system, a focus-error detector for generating a focus-error signal in response to light impinging on the detector is a positive lens disposed intermediate an optical system supplying the reflected light beam for indicating focus and the focus-error detector. Interposed between the optical system and the focus-error detector and aligned with the positive lens is an aperture which transmits a minor asymmetrical portion of the reflected light beam. The asymmetry and the portion of the passed light determine the dynamic range of the focus-error detector.

In a specific embodiment, the asymmetrically-disposed aperture is provided by a knife-edge detector blocking a portion of the reflected beam at about the axis of the reflected beam, combined with an apertured mask that limits the passed light to a predetermined small portion adjacent to the axis of the reflected light beam.

In a specific form of the invention, a positive lens is a spherical lens having a knife-edge mask on one side of the lens and a circularly apertured mask on the other side of the lens, with the lens being supported by the two masks.

The foregoing and other objects, features, and advantages of the invention will be apparent from the following more particular description of the preferred embodiments of the invention, as illustrated in the accompanying drawings.

BRIEF DESCRIPTION OF THE PREFERRED EMBODIMENT

Figure 1:
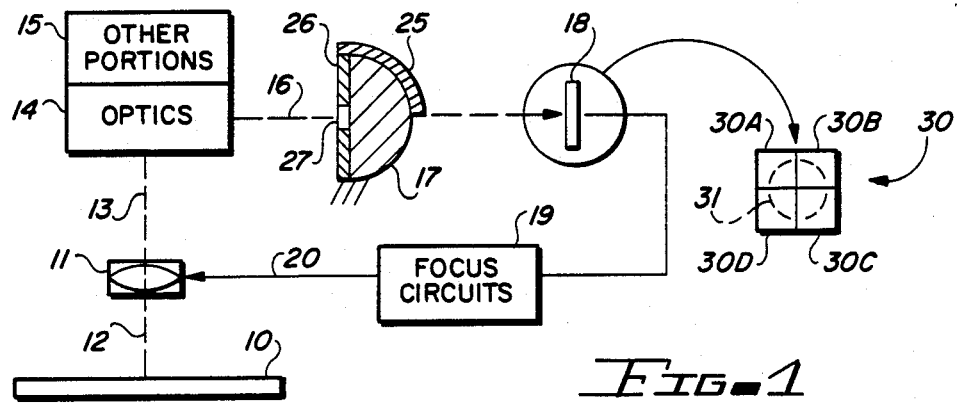
FIG. 1 is a schematic illustration of a preferred embodiment of the present invention.

Referring now more particularly to the drawings, like numerals indicate like parts and structural features in the various figures. The focus system of the present invention, as shown in FIG. 1, detects and maintains focus of a laser light beam at optical disk 10 by adjusting focusing objective lens 11. In particular, the optical length of path 12 between lens 11 optical center and disk 10 is maintained at a constant value. Lens 11 receives light to be focused over path 13 from optical system 14, constructed in the usual manner. Numeral 15 denotes other portions of the optical recorder not necessary for an understanding of the present invention. The optics 14 emitted light travels through lens 11 to be reflected by disk 10 over path 12. The reflected light travels over path 12 through lens 11, then over path 13 to optics 14, which diverts the reflected light to path 16. Spherical lens 17 receives the reflected light and focuses same at the focal plane of focus detector 18. The focus-error signal generated by detector 18 is supplied to focus circuits 19, which in turn supply focusing-control signals over control path 20 to lens 11. The construction of focus circuits 19 and focusing objective lens 11 is well known and is not described for that reason.

The embodiment illustrating the invention centers around spherical lens 17, which can also be any positive focusing lens. Off-center opaque mask 25 is disposed on the spherical surface of lens 17 and provides the well-known knife-edge focusing action to detector 18. The spacing between lens 17 and detector 18 is a function of the focal length of lens 17. In accordance with the invention, opaque mask 26 is disposed at spherical lens 17 and has a central circular aperture 27, having a size preferably designed to pass about fifty percent of the energy of the reflected light beam traveling path 16. Since a reflected light beam has a Gaussian energy distribution, the aperture 27 is preferably axially aligned with the axis of the reflected light beam. Masks 25 and 26 can be constructed of spring steel for yieldably receiving spherical lens 17 for mounting same in the optical recorder. The two masks 25 and 26 can also be sputtered or vapor-deposited metal, or foil that is adhesively secured to the lens 17 surfaces. Other forms of masks can also be envisioned. Mask 25 can be placed upon the planar surface of lens 17, while mask 26 can be put on the curvilinear surface. Spherical lens 17 can be a true hemisphere, a hemicylinder lens, or other form of positive lens. The masks 25, 26 can be disposed between lens 17 and detector 18 or both be on the surface facing path 16 or the curvilinear surface facing detector 18, all as shown in FIG. 1.

Detector 18 is shown as a so-called quad detector 30 having four detector elements, 30A–30D. Two of the detector elements 30A and 30D are ohmically connected together as are elements 30B and 30C. This electrical connection causes the detector to act as a two-element detector, which is commonly used in knife-edge focus detection. When light beam 12 is properly focused at disk 10, the shape of the light beam reflected by disk 10 to detector 18 is a circle, as indicated by numeral 31. Out-of-focus conditions distort the shape of the light beam, causing differing light intensities to impinge on the two sections of detector 18, as is well known, for producing a focus-error signal.

Figure 2:
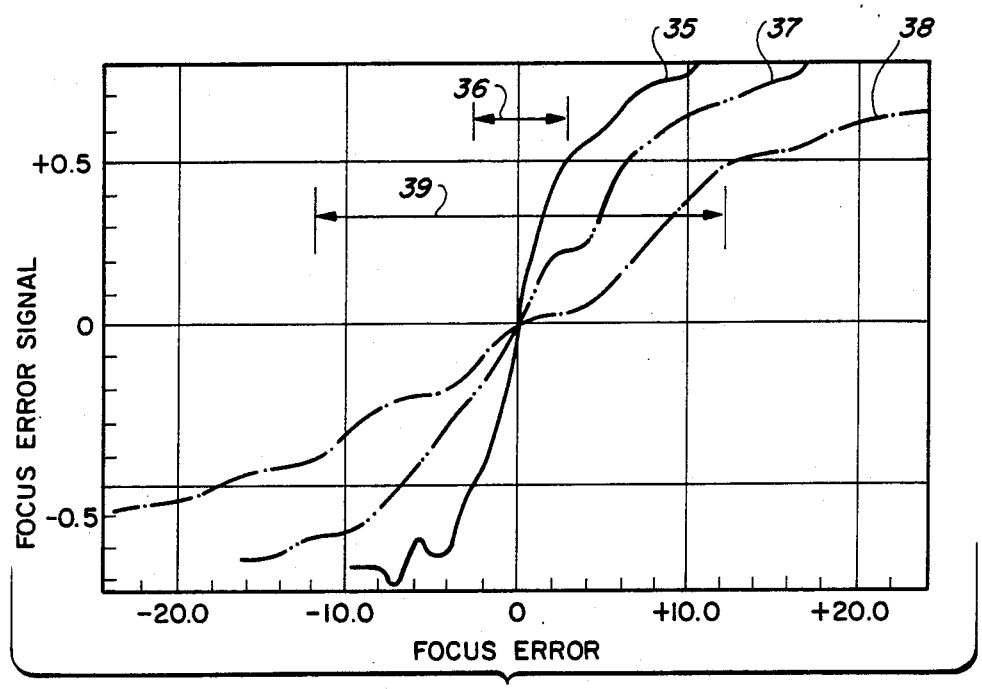
FIG. 2 graphically illustrates the dynamic range of focus detection achievable by practicing the present invention such as shown in FIG. 1.

FIG. 2 illustrates the operation of aperture 27 with respect to the generation of focus-error signals by detector 18. The focus error is along the horizontal ordinate, or abscissa, while the focus-error signal is on the vertical ordinate. Numeral 35 indicates the focus-error signal generated by detector 18 when mask 26 is dispensed with, i.e., the prior-art performance of a knife-edge detector. The effective dynamic range of the error signal 35 is illustrated by double-headed arrow 36.

Curves 37 and 38 illustrate applying the invention to the FIG. 1 illustrated apparatus by inserting aperture mask 26 on spherical lens 17. Focus-error signal 37 represents the signal generated with a relatively large aperture 27; for example, using 0.003 millimeter diameter aperture. Line 38 shows the focus-error signal resulting when a 0.002 millimeter aperture would be applied to the FIG. 1 illustrated apparatus. The dynamic focus-detection range resulting from curve 38 is illustrated by double-headed arrow 39. The figure shows that the dynamic range of focus-error detection, i.e., the more lineal portion of the focus-error curves shown in FIG. 2, is greatly increased by employing aperture 27 over that provided by the prior art. A corollary is that the dynamic range of the focus detector can be selected in designing optical recorders by using the present invention. The aperture does decrease the total amount of light impinging upon the focus detector 18. A lower light intensity can decrease the signal-to-carrier noise ratio which, under certain circumstances, can cause error conditions; on the other hand, it is desired to have a maximal dynamic range. These two parameters can be combined using known engineering design techniques to optimally design a knife-edge focus detector for a particular recorder by practicing the present invention, i.e., maximizing dynamic range while maintaining an acceptable signal-to-carrier noise ratio.

Figure 3:
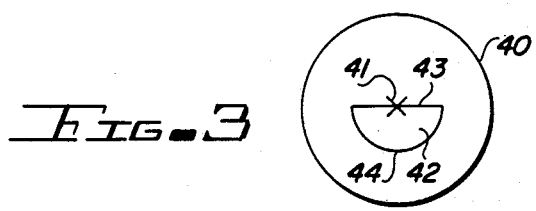
FIG. 3 schematically illustrates the effective aperture of the apparatus of FIG. 1.

The aperture 27 and mask 25 optical effect on the beams being transmitted to detector 18 is schematically shown in FIG. 3. Numeral 40 denotes the idealized circular shape of reflected beams traveling along path 16. Numeral 41 denotes the central axis of that beam. Numeral 42 denotes the effective light passed through aperture 27 and past opaque mask 25. The total amount of energy reaching focus detector 18 is approximately twenty-five percent of the light energy found at path 16. Line 43 represents the effect of mask 25 on the light beam, while the semicircular line 44 represents the effect of circular aperture 27.

Various forms of masks and mask combinations may be employed to selectively pass portions of the center area of a light beam for effecting knife-edge focus detection and having a selected dynamic range and a predetermined light energy reaching a focus detector.

While the invention has been particularly shown and described with reference to preferred embodiments thereof, it will be understood by those skilled in the art that various changes in form and details may be made therein without departing from the spirit and scope of the invention.

What is claimed is:

1. In an optical-data-recorder focus-error system, a focus-error detector for generating a focus-error signal in response to light impinging on the detector, an optical system for supplying a light beam that can be in or out of focus, a positive lens disposed between said optical system and said focus-error detector for focusing the supplied light beam onto the focus-error detector when the beam is in focus;

the improvement including, in combination:
an asymmetrically-arranged opaque mask disposed intermediate said positive lens and said focus-error detector for occluding an asymmetrical portion of said light beam for distorting the light beam as it impinges on said focus-error detector; and
an apertured opaque mask disposed intermediate said positive lens and said optical system with the aperture being centered on said light beam.

2. In the focus-error system set forth in claim 1 wherein said positive lens is a spherical lens having a first surface facing said optical system for receiving said light beam from said optical system and a second surface facing said focus-error detector for supplying said received light beam to said detector, said asymmetrically-arranged opaque mask being disposed on said second surface for occluding said light beam on one side of the center of the light beam, and said apertured mask being disposed on said first surface.

3. In the focus-error system set forth in claim 2 wherein both of said masks comprise opaque films disposed on said surfaces, respectively.

4. In a focus-error system having a focus-error detector for generating a focus-error signal in response to a light beam impinging on the focus-error detector and an optical system for supplying a light beam toward said focus-error detector along an axis at the center of the beam;

the improvement including, in combination:
an apertured-opaque-mask means interposed between said optical system and said focus-error detector and having an aperture at approximately said axis and disposed asymmetrically with respect to the cross-section of said light beam;

positive-lens means optically associated with said opaque-mask means for focusing the light beam at said focus-error detector;
said opaque-mask means is a bifurcated spring clip having a first bifurcated portion having an aperture aligned with the axis of said light beam and a second bifurcated portion extending to about the axis, and said positive lens being retainingly disposed between said portions such that the two portions optically form an aperture asymmetrical to said axis of the light beam; and
means connected to the opaque-mask means for mounting same in the focus-error system.

* * * * *